(12) United States Patent
Woollard et al.

(10) Patent No.: US 9,110,170 B1
(45) Date of Patent: Aug. 18, 2015

(54) TERRAIN AIDED NAVIGATION USING MULTI-CHANNEL MONOPULSE RADAR IMAGING

(71) Applicant: Raytheon Company, Waltham, MA (US)

(72) Inventors: Bruce R. Woollard, Tucson, AZ (US);
Mark A. Owens, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/473,483

(22) Filed: Aug. 29, 2014

(51) Int. Cl.
*G01C 23/00* (2006.01)
*G01S 13/94* (2006.01)
*G01S 13/89* (2006.01)

(52) U.S. Cl.
CPC *G01S 13/94* (2013.01); *G01S 13/89* (2013.01)

(58) Field of Classification Search
CPC .... G01C 21/005; G01C 21/165; F41G 7/343; G01S 13/86; G01S 13/865; G05D 1/0646
See application file for complete search history.

(56) References Cited

U.S. PATENT DOCUMENTS

| | | | |
|---|---|---|---|
| 3,328,795 A | 6/1967 | Hallmark | |
| 4,829,304 A * | 5/1989 | Baird | 342/63 |
| 4,910,674 A | 3/1990 | Lerche | |
| 5,677,693 A * | 10/1997 | Frankot et al. | 342/25 C |
| 6,233,522 B1 | 5/2001 | Morici | |
| 6,400,306 B1 * | 6/2002 | Nohara et al. | 342/25 R |
| 6,512,976 B1 | 1/2003 | Sabatino et al. | |
| 7,522,090 B2 | 4/2009 | Hawkinson | |
| 2004/0178943 A1 * | 9/2004 | Niv | 342/29 |
| 2005/0273257 A1 * | 12/2005 | Hager et al. | 701/223 |
| 2012/0176497 A1 * | 7/2012 | Shadmi | 348/144 |

OTHER PUBLICATIONS

Walt Strickler, Overview of Radar Applications, Configurations and S-parameter based Pulse Measurements Anritsu, Rev. A. 2013.

* cited by examiner

*Primary Examiner* — Redhwan K Mawari
(74) *Attorney, Agent, or Firm* — Eric A. Gifford

(57) ABSTRACT

A terrain aided navigation using multi-channel monopulse radar imaging to provide a navigation position update. The monopulse radar transmits a single RF pulse transmission or multiple quick RF pulse train bursts to generate a monopulse radar image that can be correlated with a digital terrain segment to provide navigation updates when requested. The radar has monopulse and off-axis capability that allows for selection of a terrain segment within the radar's search area that will provide a good terrain correlation. The radar measurements are made on a range/Doppler cell-by-cell basis that includes angle information. The cells in the range/Doppler map corresponding to the antenna main beam return are converted into a high resolution (x,y,z) image and correlated to the selected terrain segment in the data base reference frame to provide an updated navigation position estimate.

18 Claims, 11 Drawing Sheets

TERRAIN AIDED NAVIGATION USING MULTI-CHANNEL MONOPULSE RADAR IMAGING

BACKGROUND OF THE INVENTION

1. Field of the Invention

This invention relates to terrain aided navigation for airborne vehicles, and more particularly to the use of multi-channel monopulse radar imaging having off-axis capability for terrain aided navigation.

2. Description of the Related Art

Long-range navigation such as for satellites, manned or unmanned aircraft or missiles is commonly accomplished by providing an initial position, velocity and acceleration ("PVA") and attitude, using inertial sensors on-board the air vehicle to provide inertial measurements and integrating those measurements to update a navigation PVA and attitude over time. The inertial measurements may be provided by acceleration and angular rate sensors such as in an Inertial Measurement Unit or IMU. The navigation PVA and attitude include an error component that is bounded by an uncertainty region. The uncertainty region is dependent on several factors including the accuracy of the initial PVA and attitude, the quality of the inertial sensors (which tend to drift over time), and the accuracy of the clock. Without correction, the uncertainty region of the navigation PVA will continue to grow over time.

A Kalman Filter is typically used to reduce the noise and some of the bias errors in the integrator's estimate of PVA. The noise reduction and bias corrections a Kalman Filter provides are limited to the errors that are observable with the vehicle's IMU and a priori knowledge of the platform's dynamics in the form of a "motion model". Kalman filtering reduces but does not eliminate the growth in the uncertainty region.

Terrain aided navigation has existed for serveral decades. Periodically measurements of the terrain are taken and correlated to a terrain database to correct the navigation position estimate and reset the uncertainty region.

U.S. Pat. No. 3,328,795, Terrain Contour Matching (TERCOM), first developed in the 1950's, uses radar altimeter measurements to compute a history of terrain heights and correlates that history with terrain heights from a database map. TERCOM requires labor-intensive preparation to tailor a set of terrain maps for each mission. TERCOM only works when there is terrain contour below the own-airborne vehicle. The missile is constrained to straight flight at a certain speed while taking the measurements. A further constraint stems from the assumption that the radar altimeter only provides the range to the nearest terrain directly below the vehicle (within the radar altimeter's antenna beamwidth).

U.S. Pat. No. 7,522,090 suggests a modification to TERCOM that allows for the use of a terrain height database that can be formatted independently of the flight path. A reference basket is calculated onboard from the horizontal position uncertainty, and sample points comprising the horizontal position and altitude sample (i.e. the difference between the vertical inertial altitude and the clearance altitude at the horizontal position) are correlated over the reference basket. The sample history continues to grow until a satisfactory correlation can be achieved. The reference basket is a set of cells in the terrain database and remains constant over the history.

Honeywell developed an interferometric radar sensor and associated algorithm called Precision Terrain Aided Navigation (PTAN), patented under U.S. Pat. No. 6,512,976. PTAN provides more precise measurements, and in particular provides not only the range to the nearest terrain, but also bearing angles. Locating a terrain feature with an accuracy that is finer than the resolution of the terrain database allows for a more accurate position fix. PTAN requires three antennas with a significant spatial separation to get the full angular information, which limits its use to vehicles that are large enough to accommodate this spacing, and requires expensive calibration of the boresight angles to a high accuracy.

U.S. Pat. No. 4,910,674 Navigation of Aircraft by Correlation proposes a method of navigation in which the radar altimeter (the millimeter wave sensor operating at about 94 GHz) is scanned back and forth in a substantially vertical down direction across a prescribed flight path to measure altitude (see FIG. 2). The sequence of altitude measurements is fed to the correlator.

U.S. Pat. No. 6,233,522 B1 proposes a radar that gathers terrain data that is compared to a stored terrain data base using a test statistic. The test statistic can be used to validate the terrain data base information and/or the aircraft position data. There is no way to definitely confirm an aircraft's reported position due to the statistical nature of the radar signals. However, by accumulating evidence from a variety of positional systems, it is possible to reject the aircraft's reported position as an unlikely event given active sensor data and DTED data. The method is based on statistical concept of hypothesis testing. A test statistic is defined that is used to determine if there is sufficient evidence to reject the conjecture that the information in the DTED along with the outputs from the aircraft's NAV, and FMS are consistent with the active sensor readings. This method is applicable to real beam radars, monopulse radars and laser radars (Col 3, lines 35-47).

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides terrain aided navigation using multi-channel monopulse radar imaging. The monopulse radar transmits a single RF pulse transmission or multiple quick RF pulse train bursts to generate a monopulse radar image that can be correlated with a digital terrain segment to provide a navigation updated when requested. Updates do not require continuous RF transmissions to build a sufficient history for correlation. The monopulse radar antenna main beam is scanned off-axis (forward or to either side), either mechanically or electronically. This allows for selection of a terrain segment within the radar's search space that will provide a high probability of a good terrain correlation. In some cases the width of the antenna main beam may be varied, which further enhances terrain selection and correlation. The radar computes angle measurements on a range/Doppler cell-by-cell basis. The measured range, Doppler and angles are used to generate a range/Doppler map (RDM), which in turn is converted to a high resolution three-dimensional image (x,y,z). The cells' range, Doppler and angle information and the commanded off-axis scan angle are used to determine the indexed cells that correspond to the antenna main beam return. The range and angle information, and possibly Doppler, are used to map each of these cells into (x,y,z) space to create the three-dimensional image. This radar image is correlated with the selected digital terrain segment from the database in the reference frame of the database to update the navigation position estimate.

In an embodiment, an airborne vehicle includes the capability to make inertial measurements of its motion, a multi-channel monopulse radar configured to transmit and receive an RF pulse burst in the 2-35 GHz frequency to image the terrain below, and avionics hardware to process the reflected RF data to update the navigation position estimate. The antenna main beam can be directed off-axis to either side or forward along the vehicle's flight path to define a radar field of regard (FOR) search space. A digital terrain elevation database comprising elevation z of terrain at given locations (x,y) in a reference frame is loaded onto the vehicle. The database is formatted independently of the flight path of the airborne vehicle over the terrain.

The avionics hardware continuously updates a navigation position estimate (x,y,z) based on the inertial measurements. The navigation position estimate has an error component bounded by an uncertainty region that increases with time based on accumulated errors of the inertial measurements. In response to a request for a terrain aided update, the avionics hardware searches the digital terrain elevation database within the radar FOR search space to select a terrain segment that will provide a good correlation and computes an off-axis angle to image the selected terrain segment. In general, terrain segments with prominent features that provide a measure of variability or roughness in elevation over the segment should provide good correlation. An auto-correlation operator is one way to select terrain segments.

The multi-channel monopulse radar transmits at least one RF pulse burst via the radar's antenna at the commanded off-axis angle to image the terrain below. The radar receiver receives the reflected RF energy from the terrain segment with the following RF measurements; range, Doppler, Az and El angle measurements (processed from the multi-channels) with an intensity Q. These radar measurements are indexed on a cell-by-cell basis to create a three-dimensional range/Doppler map (RDM) that is converted to a three-dimensional image in (x,y,z) The avionics hardware correlates the radar's three-dimensional image against the selected digital terrain segment in the terrain elevation database reference frame; latitude, longitude, reference to sea level, to determine a navigation position estimate. In an embodiment, the navigation position estimate is varied to find the best correlation in (x,y,z) space. This can be computationally intensive. In another embodiment, an estimate of the vehicle altitude is used to reduce the problem to finding the best correlation in (x,y) space that provides the position of the antenna main beam on the ground. This vector is added to the slant range vector from the vehicle to update the navigation position estimate.

In an embodiment, the radar image of the selected terrain segment is oversized to account for potential position error. However, for reasons of efficiency of the correlation process and to avoid false correlations, the radar image, although larger, should be sized/bounded by the IMU errors affecting the air vehicle's known position. If the image is too big, the correlation process is very inefficient and the risk of false correlations increases. Active electronic scanned array (AESA) radar can control the main beam size and shape to image a terrain segment larger than the selected terrain segment to account for the current position uncertainty. In many instances the beam width is fixed and will image a terrain segment size that is dependent on the air vehicle's altitude above ground and the slant angle to the terrain segment. Many other techniques for sizing the beam and correlating the image to the database will be apparent to those skilled in the art.

These and other features and advantages of the invention will be apparent to those skilled in the art from the following detailed description of preferred embodiments, taken together with the accompanying drawings, in which:

DETAILED DESCRIPTION OF THE INVENTION

The present invention provides terrain aided navigation using multi-channel monopulse radar imaging. The monopulse radar transmits a single RF pulse transmission or multiple quick RF pulse train bursts to generate a monopulse radar image which can be correlated with a digital terrain segment by the avionics hardware to provide navigation updates when requested; updates do not require continuous RF transmissions to build a sufficient history for correlation. The radar has monopulse and off-axis scanning capability (mechanical or electrical) of the antenna main beam (fixed or variable width) that allows for selection of a terrain segment within the radar's search area that will provide a good terrain correlation (confidence and accuracy of correlation). The radar measurements on a range/Doppler cell-by-cell basis include angle information. The cells in range/Doppler map corresponding to the antenna main beam return are converted into a high resolution (x,y,z) image and correlated to the selected terrain segment in the data base reference frame to provide an updated navigation position estimate.

The term "correlate" as used herein in not strictly limited to the mathematical correlation operator $$Cmn = \frac{m \cdot n}{|m| \cdot |n|}$$

where m is the radar generated image, n is the selected terrain segment, and "•" is the dot product operator. The function Cmn is typically viewed as a modified version of one of the original functions, giving the area overlap between the two functions as a function of the amount that one of the original functions is translated. The correlation function will peak at an offset that best aligns the two images. Approximations of the correlation operator or other metrics may be used to determine the (x,y) offset that aligns the radar generated image m with the selected digital terrain segment n database. For example, since the selected terrain segment n is a constant in this application, the operation of maximizing Cmn is the same as the operation of minimizing a sum of the elevation differences between m and n. A "good" correlation result is one that is both likely to represent the correct offset to align the images, not a "false correlation", and one that provides an accurate measure of the offset. The more accurate the offset, the more accurate the updated navigation position estimate and reset of its uncertainty region.

Figure 1:
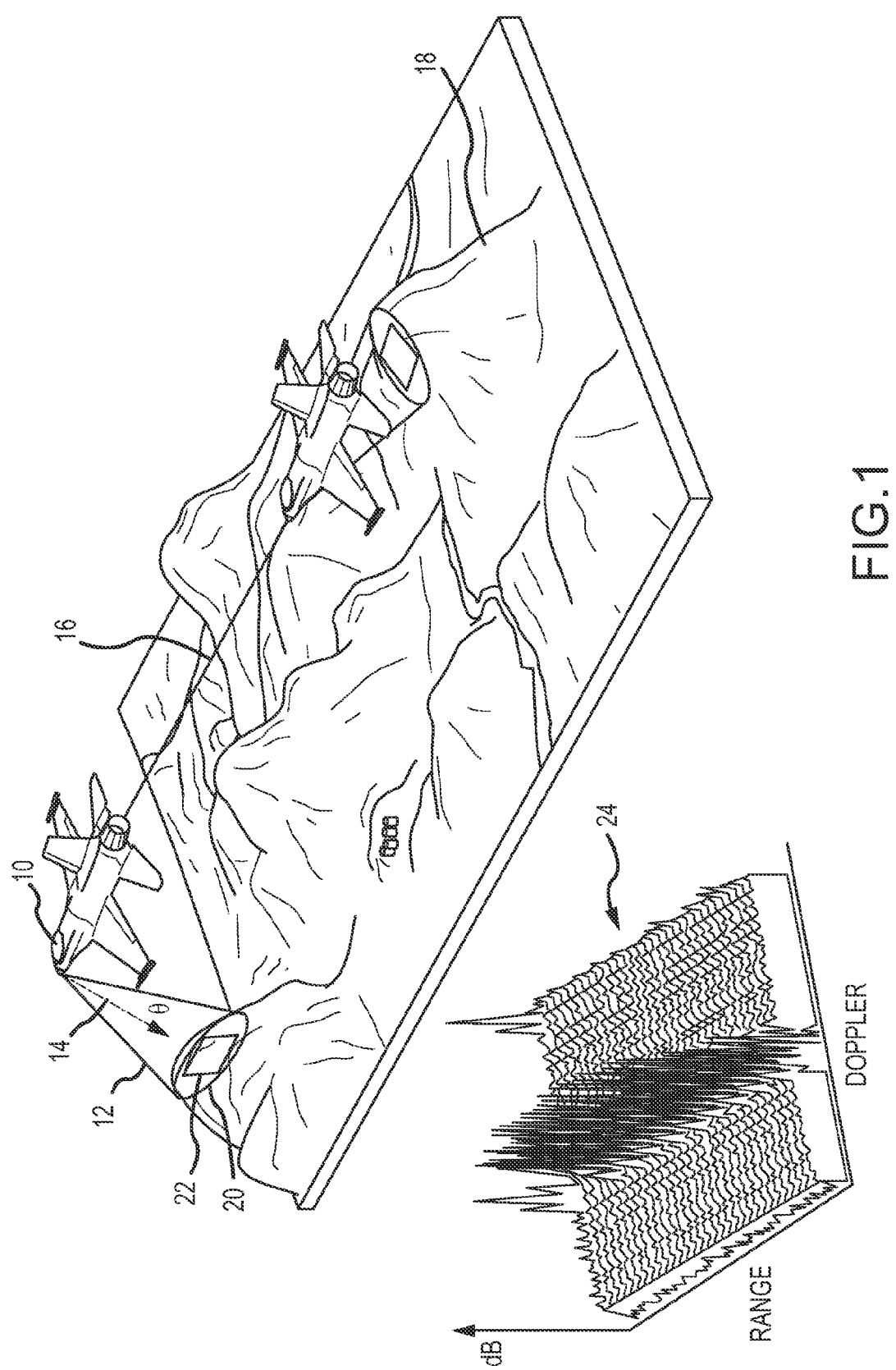
FIG. 1 is a diagram of an airborne vehicle using a multi-channel monopulse radar to transmit and receive a forward monopulse reflection from an off-axis terrain segment to provide a navigation update.

Referring now to FIG. 1, in an embodiment an airborne vehicle 10 includes a terrain elevation database, (aka a terrain height database), an inertial measurement unit (IMU), a multi-channel radar system configured to transmit an RF burst in a 2-35 GHz band in an antenna main beam 12 at a commanded off-axis angle 14 (forward or off to either side) from its flight path 16 and beam width to illuminate terrain 18 below and avionics hardware. This approach assumes that an initial navigation position estimate for the vehicle is known to within the search area capability of the radar. For example, in a cruise missile or unmanned aerial vehicle (UAV), an inertial transfer alignment from the launch system is performed, and separation from the launch system is initiated. As the airborne vehicle flies, the IMU measures the vehicle's accelerations along and angular rates about three orthogonal axes and the avionics hardware continuously computes an updated navigation position estimate. This estimate includes a measurement error component that is bounded by an uncertainty region. As the airborne vehicle flies and the avionics hardware updates the navigation position estimate, the IMU drift errors accumulate and the airborne vehicle's known position is bounded by an ever increasing uncertainty region. Periodic navigation updates will be needed based on the Kalman filter's uncertainty region, periodic timing or other events.

Upon issuance of a request for a terrain aided navigation update, the radar is commanded to transmit at least one RF pulse burst in beam 12 at off-axis angle 14 to image a terrain segment 20 that encompasses a specific terrain segment 22 pre-selected to provide a high probability of a good correlation, hence accurate correction. The radar generates a three-dimensional range/Doppler map (RDM) 24 in which each range/Doppler indexed cell includes a monopulse angle vector (x,y,z) with an intensity Q. The cells in the RDM corresponding to the antenna main beam RF reflections from the terrain below, are converted to a 3D image in (x,y,z). The cells' range, Doppler and angle information and the commanded off-axis angle are used to determine the indexed cells that correspond to the antenna main beam return. The range and angle, and possibly Doppler, are used to map each of these cells into (x,y,z) space to create the three-dimensional image. This image is correlated to the pre-selected digital terrain segment 22 in the terrain database to determine a navigation position update and reset the uncertainty region.

Based on the current navigation position estimate and the radar's FOR search space, the avionics hardware searches the terrain database for a terrain segment 22 that will produce a good correlation. In general, prominent terrain features either forward or off-axis of the vehicle's current navigation position estimate and flight path such as terrain peaks and valleys, hills, mountain peaks will provide sufficient variability in the elevation data of the terrain segment to provide a good terrain correlation. Candidate terrain segments may be evaluated using different metrics such as a roughness metric, variance or an auto-correlation function.

The avionics hardware determines which terrain segment 20, and how large of a terrain segment, the radar needs to illuminate via the antenna's main beam, and computes the appropriate radar angle, relative to the airborne vehicle's navigational reference plane, to the desired terrain segment. The terrain segment to be illuminated is determined by the airborne vehicle's altitude, the radar frequency and antenna's beam width (or the beam width capability of the active electronic scanned array (AESA), if one is used). For example, a 2 Km×2 Km terrain RDM could be generated with 2 meter accuracy or better, or a smaller spot mode of 100 m×100 m (or smaller) with 15 cm accuracy RDM can be generated, depending on the airborne vehicle's altitude and the antenna's beam width.

As shown, in this particular embodiment the illuminated terrain segment 20 is larger than the selected digital terrain segment 22. This may be done to account for the uncertainty in the current navigation position estimate to ensure that the selected terrain segment 22 is included in the radar illuminated terrain segment 20. Many other techniques for sizing the beam and correlating the image to the database will be apparent to those skilled in the art.

The radar does not need to be continuously illuminating (transmitting) to the terrain segment. Monopulse radar generates the RDM from a RF pulse burst transmission or from multiple quick RF pulse burst transmissions (produces a higher signal to noise ratio (SNR) signal/image). Therefore, the only time the radar needs to transmit is when a position update is desired or required by the navigation processor. The radar does not have to continuously transmit and receive to gather measurements to build a history sufficient for terrain correlation. In many instances, the vehicle wants to limit the frequency and duration in which the radar is transmitting, thereby minimizing the air vehicle's RF transmissions/detectability.

By virtue of being a multi-channel radar system with monopulse capability, the radar can make angle measurements on a range/Doppler cell-by-cell basis. The received RF analog signal is converted to a digital signal (analog-to-digital) that produces range and a Doppler shift, which is used with the off-axis angle to sort out the appropriate RF signals; the correct signal return having the correct range, and angle vectors measured in Az/El. For example, in a 4-channel digital receiver, the channels/quadrants can be summed and differenced in different combinations to produce the Az and El angles for each range/Doppler measurement.

The radar processing assumes that the processed returns are from the antenna main beam. It is important to minimize any antenna side lobe returns such that these side lobe returns are not part of the RF signals measurements used to generate the RDM. This can be achieved either with a beam nulling pattern that has sufficiently low side lobes or by thresholding the received RF signals. An additional guard channel and antenna element can be used to set the threshold.

In addition, the radar can be used in a secondary mode to measure the air borne vehicle's Doppler sift (airborne vehicle speed) information from the ground return information without generating a 3D map. These Doppler measurements can be used in this mode to estimate INS velocity errors, thus reducing the INS errors and the required frequency of the air vehicle's position fixes and/or the required quality of the airborne vehicle's IMU.

The coordinate system is an (x,y,z) reference frame where each value (x,y,z) is in meters (or an equivalent metric). The coordinate reference is the ownship frame. Ideally the reference frame is "space stabilized" meaning the one of these axis aligns with 'north' and the another aligns with 'down'.

The objective is to convert the range/Doppler/angle measurements into a local (x,y,z) frame that allows the data to be correlated with the digital terrain database in its reference frame without manipulation of the database. That is, rather than hypothesize position and then convert the digital terrain database into radar coordinates (range/Doppler/angle), the radar data is converted into digital terrain database coordinates. This means that only a 'one time' conversion is needed per update.

When the radar illuminates the selected terrain segment and generates the RDM, the avionics converts the RDM (with the bearing information) into an (x,y,z) image in the reference frame e.g. coordinates/spacing of the digital terrain database and then correlated with the digital terrain data. The accuracy of the IMU will dictate/bound the uncertainties going into the Kalman covariance matrix, which will determine how long the air vehicle can fly before the process repeats itself or when the next monopulse RDM to terrain database correlation is required.

Figure 2A:
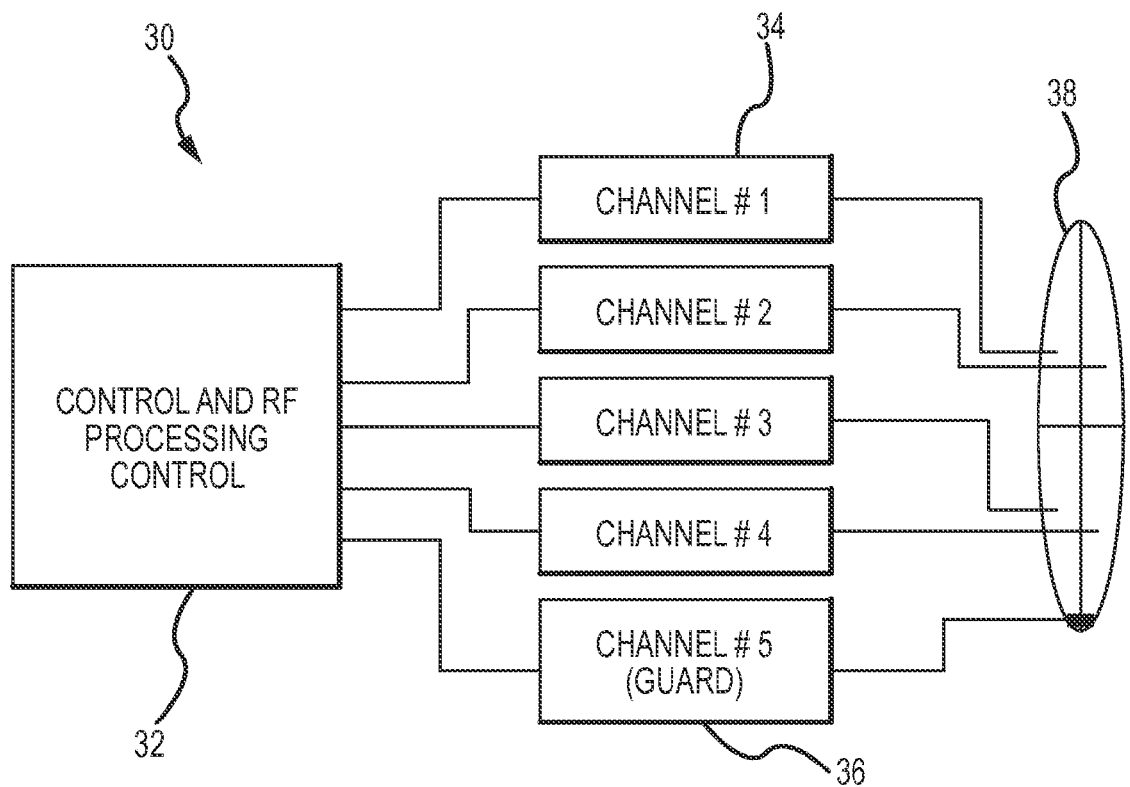
FIG. 2a is a block diagram of a multi-channel radar.
Figure 2B:
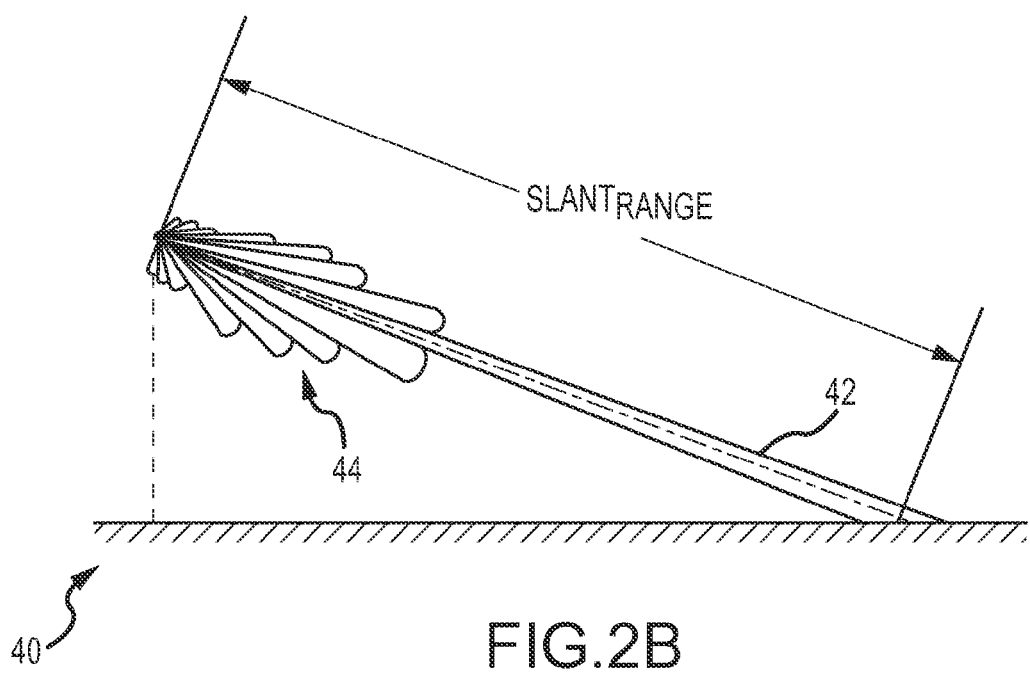
FIG. 2b is a diagram illustrating the main and side lobes of a radar signal and FIG. 2c is a plot depicting the rejection of the side lobes using a threshold set by a guard channel.
Figure 2C:
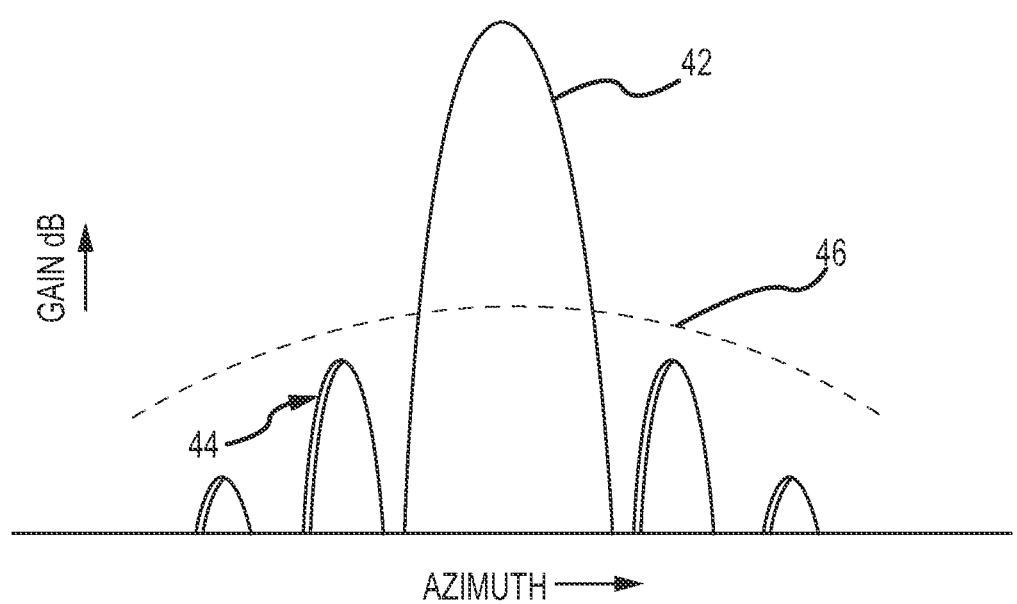

An embodiment of multi-channel radar 30, is illustrated in FIGS. 2a through 2c. The hardware of a multi-channel radar, the control to generate a single or short burst of RF pulses and the processing to form a range/Doppler map has existed for many years and has found wide application in aircraft radar. The multi-channel radar is described in "Overview of Radar Applications, Configurations, and S-parameter-based Pulsed Measurements" Anritsu, Rev. A. 2013, which is hereby incorporated by reference.

The radar 30 includes control and RF processing control 32, five RF digital receive channels 34, of which one is guard channel 36, and a radar antenna 38. For a radar processing system to perform Az/El Sum/Delta measurements, at least 3 simultaneously sampled RF channels (not including any guard channel) are required to create the sum and delta antenna computations to produce the Az/El angle measurements. Each RF receiver channel includes an A/D converter and various filters. Radar antenna 38 may be a single planar antenna as illustrated or arrays of small transmit/receive modular antenna elements that create an antenna array. An AESA array can be configured to perform Az/El Sum/Delta measurements. The radar is controlled to transmit at least one RF pulse in a beam 40 at a forward or side off-axis angle 42 with a specified antenna main beam width. The size, shape and angle of the combined beam 40 are determined by the radar's planar antenna design or AESA's commanded configuration.

Beam 40 includes an antenna main beam 42 and typically also includes radar side lobes 44. It is important that the processed RF returns are from the main beam 42 and not the side lobes 44. To this end, the magnitude of the intensity Q for each of the four channels can be thresholded against a level 46 set by the guard channel to reduce side lobe returns. A guard channel consists of a separate receiver channel whose input is supplied by a small antenna mounted on the face of a planar antenna design or the configuration of an AESA system to utilize several outside antenna elements to be dedicated as a guard channel. The beam width of the guard horn's main lobe is sufficient to encompass the entire region illuminated by the radar antenna's principal side lobes, and the gain of the horn's main lobe is greater than that of any of the side lobes. In theory, any detectable target (signal) in the radar antenna's side lobes, therefore, will produce a stronger output from the guard receiver than from the main receiver channels. On the other hand, because the gain of the radar antenna's main lobe is much greater than that of the guard antenna configuration, any target in the radar antenna's main lobe will produce a much stronger output from the main receiver than from the guard receiver. Therefore, by comparing the outputs of the two receivers and inhibiting the output to the main receiver when the output of the guard receiver is stronger, the prevention of any targets that are in the side lobes are prevented from appearing in the radar main receiver range/Doppler map. The guard channel as described in "Introduction to Airborne Radar, second edition" New Jersey: SciTech Publishing, Inc., 1998, which is hereby incorporated by reference.

Figure 3:
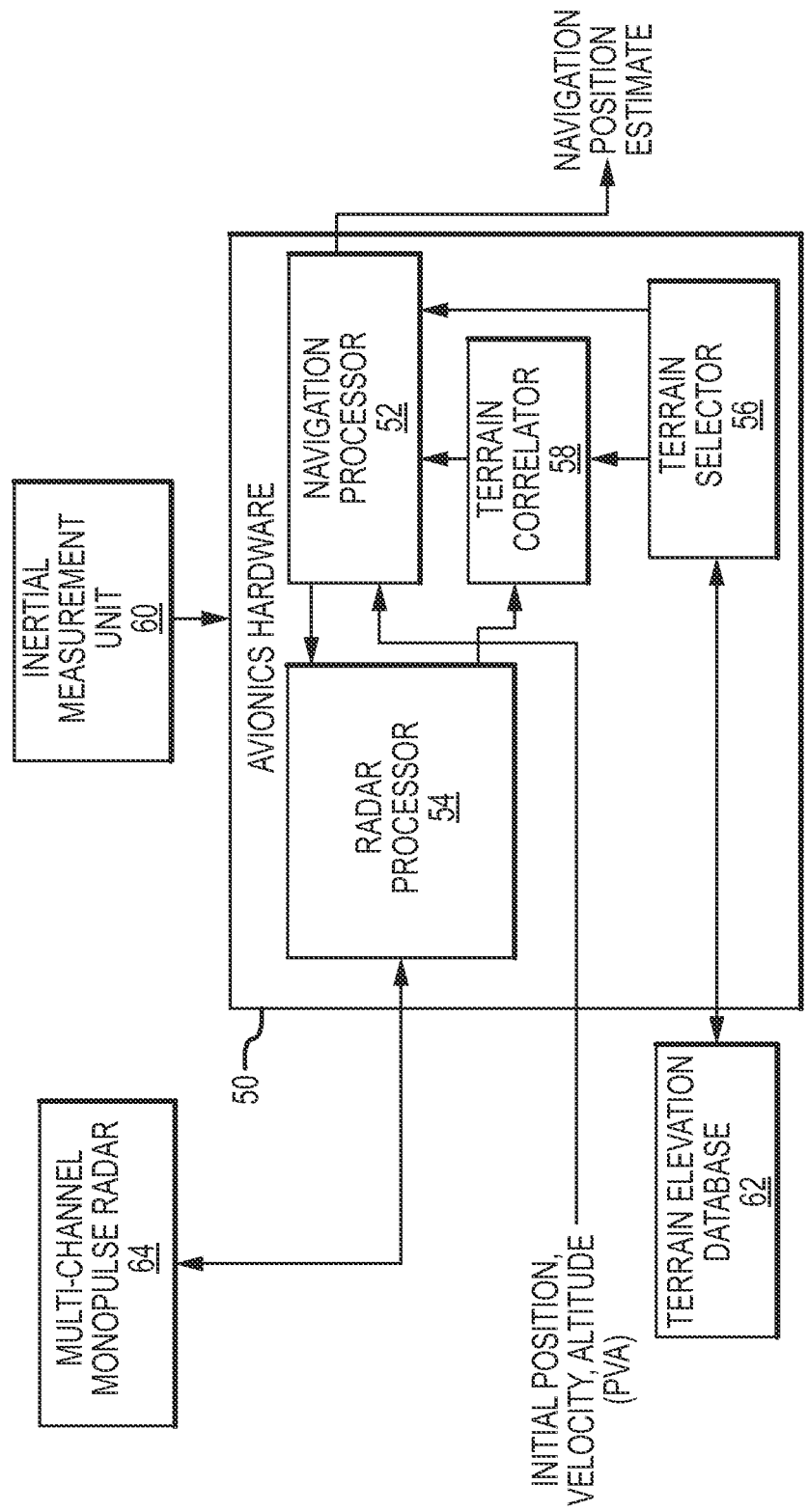
FIG. 3 is a block diagram of an embodiment of the multi-channel monopulse radar, avionics hardware, terrain elevation database and IMU for radar-aided terrain aided navigation.

An embodiment of the systems on-board the air vehicle to provide terrain aided navigation is illustrated in FIG. 3. Avionics hardware 50 includes a navigation processor 52, a radar processor 54, a terrain selector 56 and a terrain correlator 58, which may be implemented in a combination of one or more computer processors. An IMU 60 provides measurements of acceleration along and angular rotation about three orthogonal axes of the vehicle and converts the measurements into acceleration and angular rate signals.

A terrain elevation database 62 is loaded onto the vehicle. The database includes elevation z of terrain at given locations (x,y) in a reference frame. The database is formatted independently of a flight path of the airborne vehicle. One example of such a terrain elevation database format is Digital Terrain Elevation Data (DTED), which is ordered by latitude and longitude. DTED uses Mean Sea Level (MSL) as a terrain reference, and the locations along latitude or longitude of all adjacent terrain elevations within a given one-by-one degree block have a constant spacing in latitude or longitude, thus forming a two-dimensional grid of terrain elevations referenced to MSL. The level (level 0-level 5) of the DTED will determine the accuracy of the terrain elevation data, where level 0 is the widest measurement post spacing with the least accurate measurements while level 5 (or equivalent) would be the closest measurement post spacing with the most accurate measurements. For example, level II DTED data has terrain elevation measurement on a 30 meter by 30 meter grid. Another example of a generic terrain elevation database format orders the elevations on a two-dimensional grid aligned with the Universal Transverse Mercator (UTM) coordinate system and uses the World Geodetic System (e.g. WGS84) as the terrain reference above MSL. The particular database 30 that is loaded onto airborne vehicle 10 contains the global terrain elevation or specific terrain elevation in specific flight areas needed for any theater of operations or possible flight paths, but the structure or format of the database is not altered or transformed based on any particular flight path.

A multi-channel radar 64 is configured to transmit an RF pulse burst in a 2-35 GHz band in a beam, forward or off-axis to-the-side, and to receive the reflected beam to image the terrain below. The avionics hardware provides a master system timing signal to the sensors to synchronize all RF data and IMU information in the navigation processor 52. The navigation processor 52 executes software that includes navigation algorithms, navigation functions, and radar and system management routines.

An embodiment of terrain aided navigation implemented by the on-board systems is illustrated in FIGS. 3 through 10.

Navigation processor 52 receives an initial PVA from an external source and constantly integrates the IMU measurements to update the navigation position estimate (e.g. azimuth, horizontal and altitude) and uncertainty region (e.g. covariance matrix of the Kalman filter) (step 70). If the uncertainty region is less than a threshold (step 72) than no radar terrain aided navigation update is required. Once the uncertainty region exceeds the threshold, the navigation processor requests that a terrain aided navigation update be made. Alternately, a request for an update could be made at regular time intervals regardless of the position uncertainty or based on a combination of elapsed time and the uncertainty region.

Based on the current navigation position estimate, flight path and the search capability of the radar, the navigation processor 52 defines a radar field-of-regard (FOR) search space within the database that is forward and to either side of the flight path of the vehicle (step 74). Terrain selector 56 runs a terrain selection algorithm on the projected search space to select a digital terrain segment (step 76). The algorithm is configured to select a terrain segment having a metric based on variability in elevation z over the terrain segment that satisfies a correlation criteria. The variability in elevation z of the terrain segment that is required for a good correlation will depend on both the resolution of the radar, altitude and the digital terrain database. If the resolution of the radar and/or database is poor, greater variability of the elevation data in the terrain segment will required. Conversely, if the resolution of the radar and database is good, less variability of the elevation data in the terrain segment will be required. In many cases, the terrain data will be interpolated to match the spacing of the more finely resolved radar imagery. The interpolated version of the selected terrain segment is stored for subsequent correlation with the radar imagery.

The algorithm should identify candidate terrain segments having pronounced features (peaks, valleys, mountains etc.), perform a convolution (auto-correlation) on the candidate terrain segments and select one of the candidate terrain segments that exhibits sharp convolution peaks. The convolution operator is very similar to the correlation operation of actual radar imagery with the selected terrain segment. Thus, terrain segments that exhibit well defined peaks in the convolution are good candidates for selection. Alternately, the algorithm could compute a measure of variability of the elevation data within a candidate terrain segment such as a variance or roughness measure. Those segments with high variability indicate a greater likelihood of a good correlation.

Avionics processor 50 calculates the off-axis radar transmit angle to the selected terrain segment (and the AESA beam size if applicable (i.e. the width of the antenna main beam)) (step 78). If the radar antenna is planar, then the RF beam width is fixed and is a known entity that will be factored into the terrain selection algorithm. The off-axis angle, beam size and timing information are passed to the multi-channel monopulse radar that transmits at least one RF pulse burst at the off-axis angle in the prescribed beam size and receives the RF reflections (step 80).

Figure 5A:
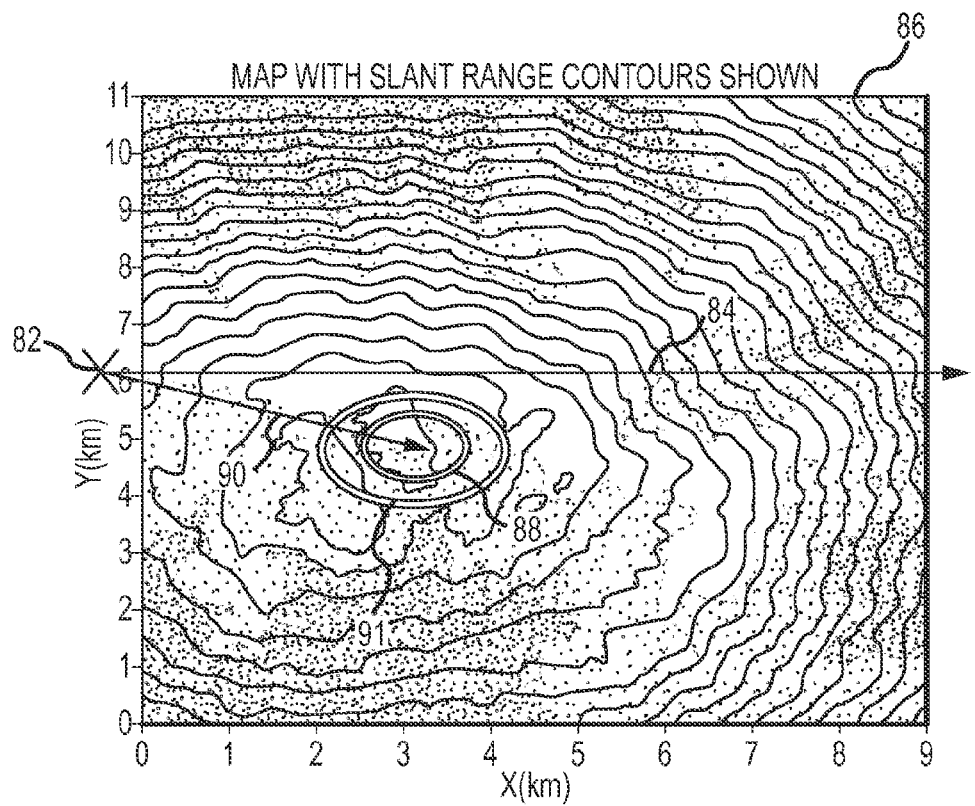
FIGS. 5a and 5b depict a selected digital terrain segment and radar image of the selected digital terrain segment.

As shown in FIG. 5*a*, for a current navigation position estimate 82 indicated by "X" and flight path 84, the navigation processor defined a maximum radar search space 86 within the terrain database. The terrain selector processed search space 86 and selected a terrain segment 88 in this case corresponding to the peak of a mountain forward and off-axis of the current navigation position. The navigation processor computes the off-axis angle 90 to the selected terrain segment 88 to produce an imaged terrain segment 91.

Figure 5B:
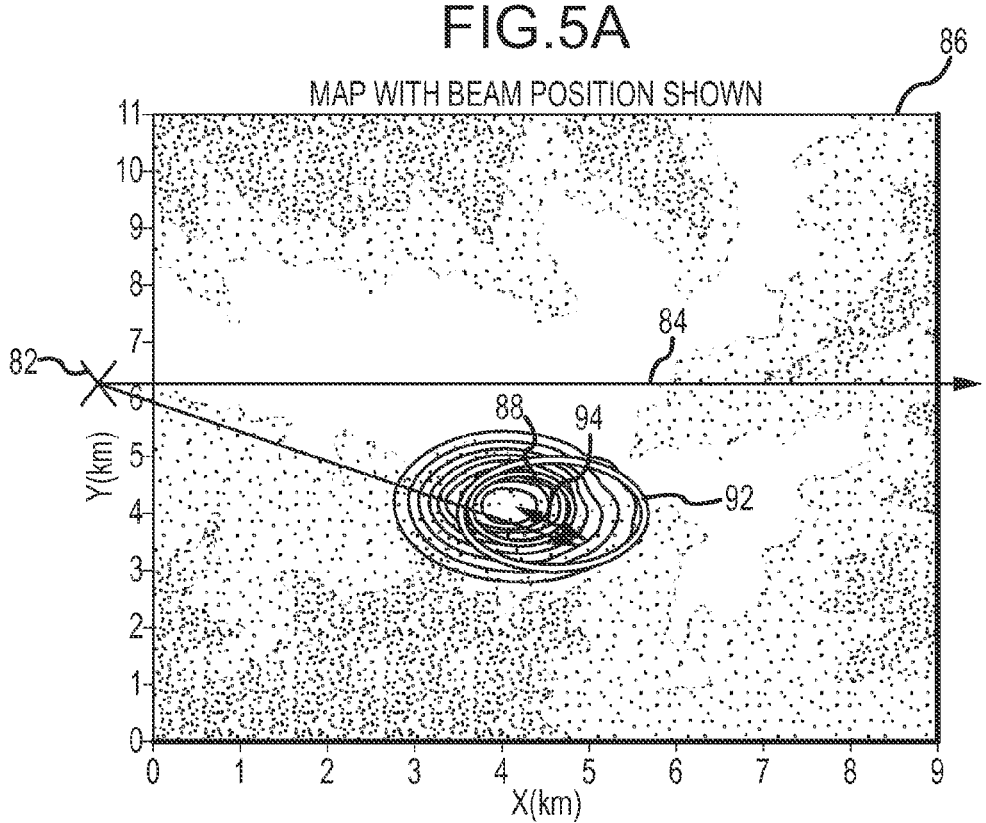

As shown in FIG. 5*b*, since the current navigation position estimate 82 includes an error component that is bounded by an uncertainty region there is a commensurate error in terrain segment that is imaged by the radar. By oversizing the radar generated terrain image segment in accordance with the uncertainty, the selected terrain segment 88 is included in the actual imaged terrain segment 92. This facilitates an efficient and accurate correlation of the imaged terrain segment 92 to the selected terrain segment 88. The correlation may be constructed in two-dimensions to produce an (x,y) offset 94 indicative of the beam position on the ground, which can be used to determine the navigation position update with a delta z (altitude) offset as well, or may be constructed in three-dimensions to include the position of the vehicle and to produce the navigation position estimate in (x,y,z) directly.

Figure 4:
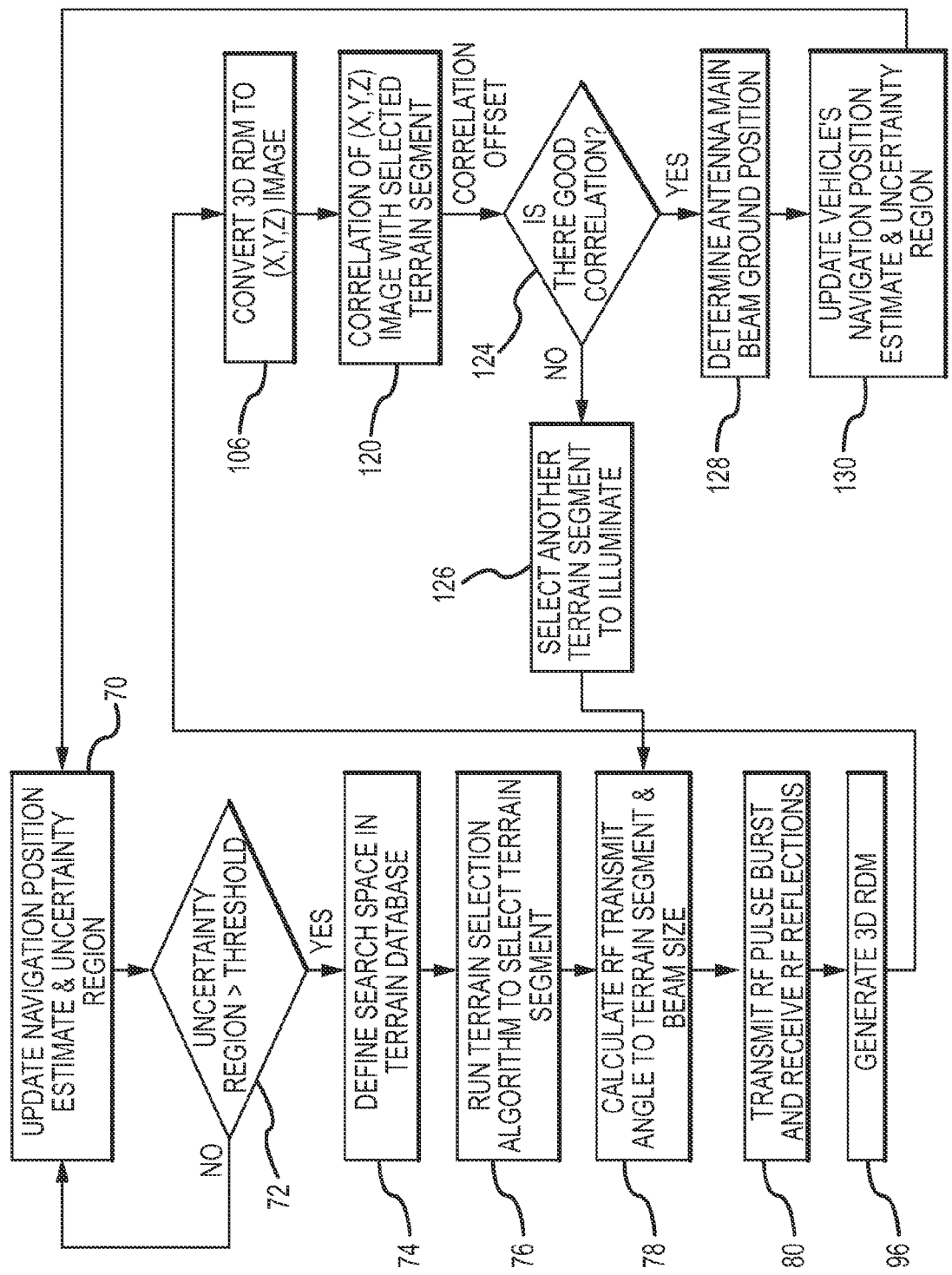
FIG. 4 is a flow diagram of an embodiment for using a multi-channel monopulse radar for terrain aided navigation.

With reference to FIGS. 3 and 4, radar processor 54 processes the RF reflection measurements, which include range, Doppler and angle information, to generate a three-dimensional range/Doppler map (RDM) in which each range/Doppler indexed cell includes a monopulse angle vector (x,y,z) from the radar main beam with an intensity Q (step 96). The range is derived from the round trip time of the transmitted RF pulse, Doppler is the measured frequency shift or range rate (velocity) of the air vehicle and the monopulse angle vector is derived from Az/E1 angles that are computed as sums/differences of the multiple channels.

Figure 6B:
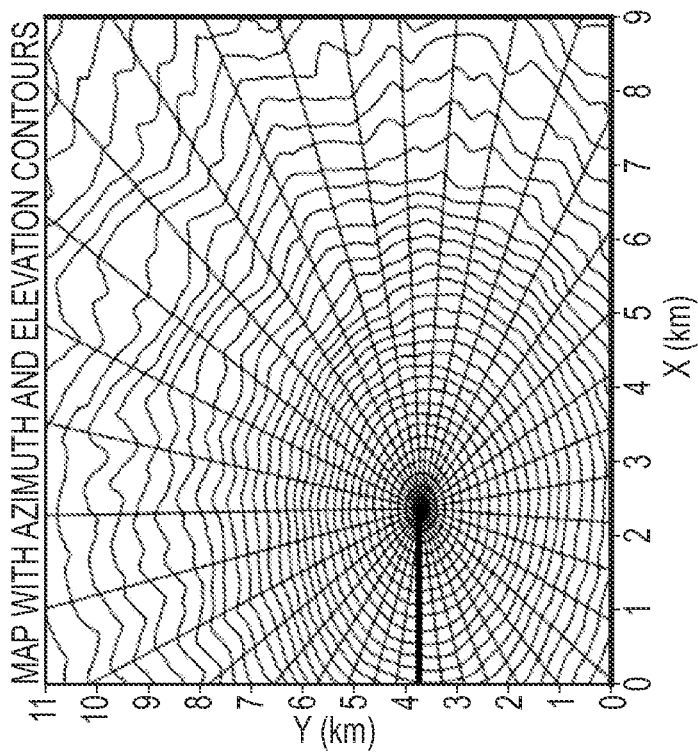
FIGS. 6a and 6b depict the Range-Doppler and Az/El measurements of the received monopulse RF reflections.
Figure 6A:
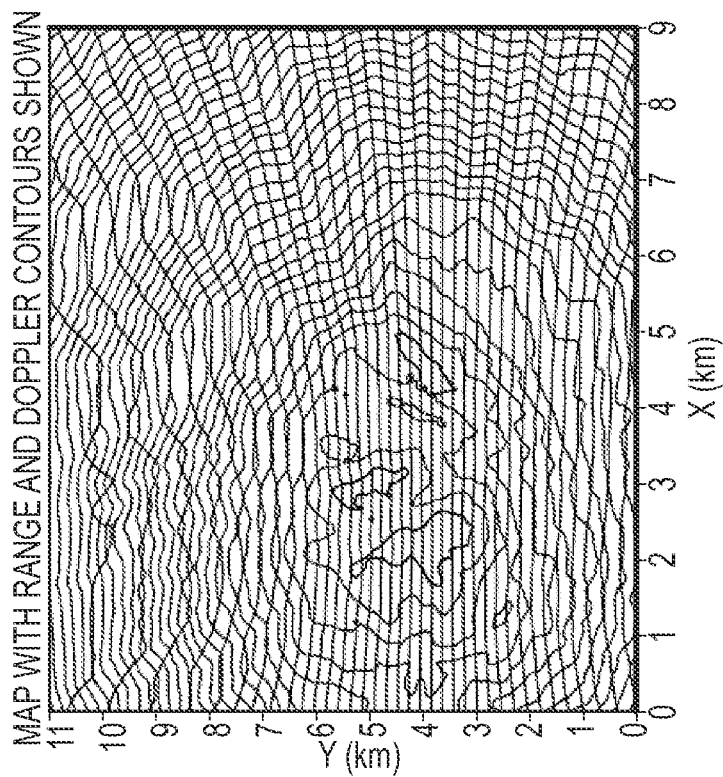
Figure 7:
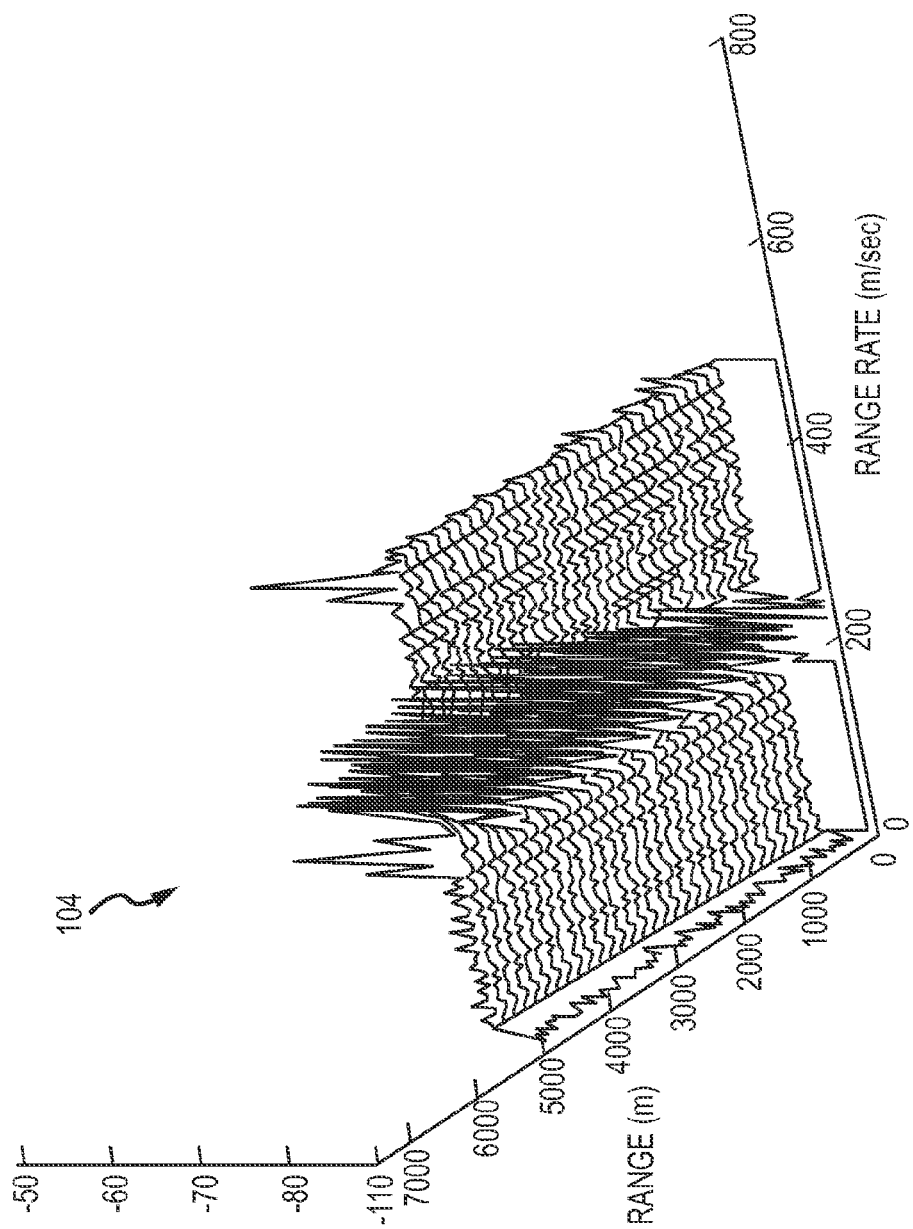
FIG. 7 is a notional three-dimensional range Range-Doppler Map produced from the Range-Doppler and Az/El measurements.

FIGS. 6*a* and 6*b* are maps of a digital terrain segment overlaid with the range and Doppler contours 100 and the Azimuth and Elevation contours 102, respectively, from the RF reflections. The Doppler measurement provides greater "bin" resolution at the outer edge of measurements than the angular measurements and vice versa. The Az/E1 measurements provide greater resolution at the center of the radar's main beam, i.e. the center of the desired terrain segment. However, the Doppler measurement can be ambiguous and this ambiguity is solved using the associated angular measurements. The radar processor 54 essentially combines these two contour maps to form a 3D RDM 104 as illustrated in FIG. 7. When the two plots are overlaid, the result is a fine range/Doppler cells map with detailed Az/E1 measurements for correlation points. This in turn yields an accurate correlation, and correlation offset that produce an accurate update for the navigation position estimate.

Figure 8:
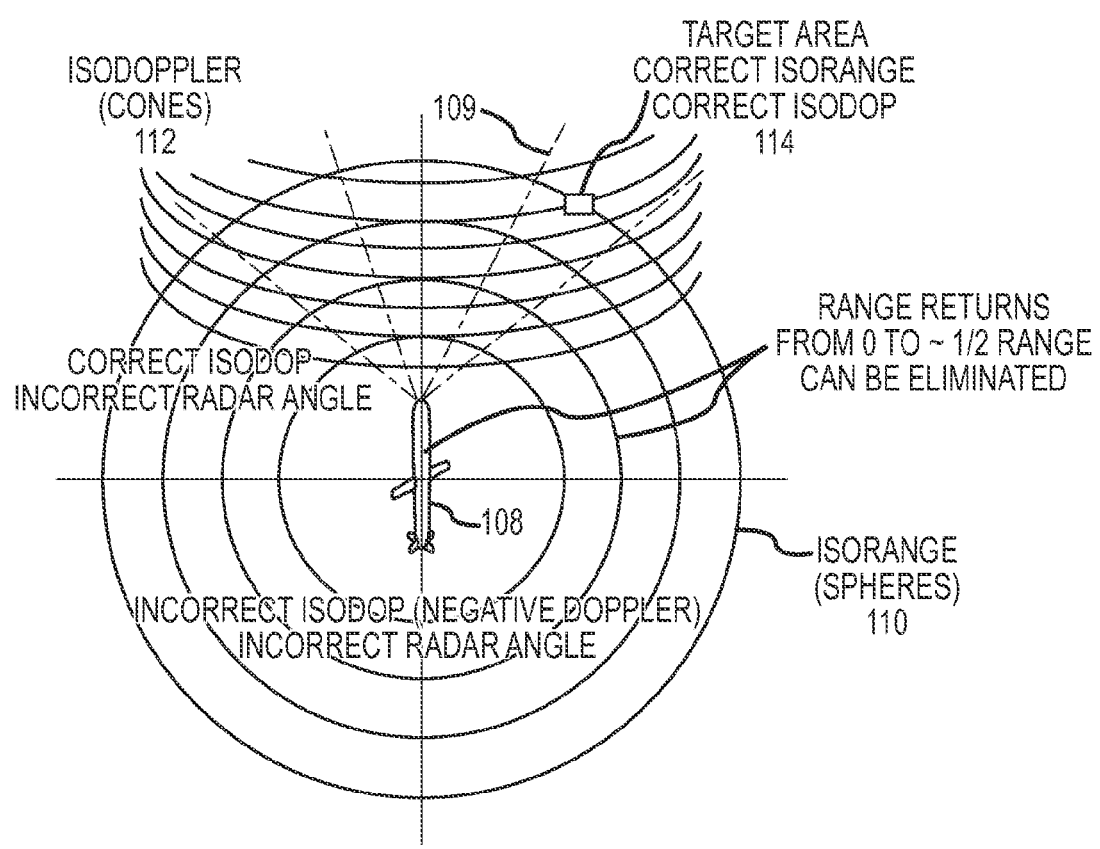
FIG. 8 is a diagram depicting an embodiment of the conversion from the three-dimensional Range-Doppler map to a three-dimensional x,y,z image.

With reference to FIGS. 3 and 4, radar processor 54 converts the 3D RDM to an x,y,z image (step 106), which is fed to terrain correlator 58. The radar processor first excludes the indexed cells that are not associated with the antenna main beam return range, Doppler and commanded beam angle. As shown in FIG. 8, an airborne vehicle 108 and commanded radar angle 109 are shown relative to the IsoRange (illustrated by the spheres 110) and the measured IsoDoppler (illustrated by the cones 112). The "overlap/intersection" 114 between the precise spheres (Isorange) and cones (IsoDoppler), reference and the radar angle illustrates the selected terrain segment. This overlap/intersection 114 determines the radar's main beam of indexed cells from which to map the monopulse angle vector (x,y,z) to a position vector of elevation z of the terrain at a location (x,y) to form a three-dimensional image in (x,y,z) of the selected terrain segment.

The portion of the spheres (range) 110 behind the vehicle can be eliminated since the airborne vehicle is traveling forward (incorrect IsoDop (negative Doppler)/Incorrect radar angle measurements (not where the main radar beam is looking)). Also the cones (IsoDoppler) 112 to the left side of the airborne vehicle can also be eliminated, which might have the correct IsoDop (positive Doppler), but does not have the correct radar angle measurements that would correspond to the commanded radar off-axis search angle. Also, the range returns from 0 to ~½ of the commanded radar search range can be eliminated due to knowing what the range to the desired target area (terrain segment) should be and that any radar returns less than the desired range/2 is not going to be the correct target area.

The radar processor the converts the index cells corresponding to the antenna main beam return into the 3D image in (x, y, z). With regards to notation, the notation {x} and refers to the set of all x. In general, the processor uses the range and angle information, and possibly Doppler, to create the 3D Image in (x,y,z).

More rigorously, let the radar beam position and the orientation of the radar array (which is not necessarily level) with respect to a space stabilized North, East, Down (NED) air vehicle reference frame be defined by coordinate frame $S_{beam}$ where:

$$S_{NED}^{beam}\begin{bmatrix} ux_x & uy_x & uz_x \\ ux_y & uy_y & uz_y \\ ux_z & uy_z & uz_z \end{bmatrix} \quad \text{Eq (1)}$$

The vector uz points in the direction of the radar beam and and ux and uy define 'right' and 'up'. Then if (az,el) is the measured azimuth and elevlation angle for a given range/Doppler cell in the beam reference frame, the line-of-sight vector in NED coordinates that points to that cell is $ur_{NED}$:

$$ur_{beam}(az, el) = \begin{pmatrix} \sin(az)*\cos(el) \\ \sin(el) \\ \cos(az)*\sin(el) \end{pmatrix} \quad \text{Eq (2)}$$

or $$ur_{beam}(\theta, \varphi) = \begin{pmatrix} \sin(\theta)*\cos(\varphi) \\ \sin(\theta)*\sin(\varphi) \\ \cos(\theta) \end{pmatrix}$$

and $$ur_{NED} = S_{NED}^{beam} * ur_{beam}$$

That is, $ur_{NED}$ is the direction to the terrain segment of ground given by the azimuth and elevation of the particular range/Doppler cell. Given the range of the cell (which is the slant range to the specified terrain segment) we can compute the position of the ground terrain segment as shown in FIG. 2b (relative to air vehicle's position) as:

$$r_{NED} \approx \text{slant}_{range} * ur_{NED} \quad \text{Eq (3)}$$

Note that so far we have described the azimuth and elevation of each cell as being the same as that of the monopulse angle. That is we have only used the measured slant range and measured angle (line-of-sight vector), but have not used measured Doppler (velocity) of the cell. While the monopulse measurement gives sub-beamwidth angle accuracy, the angle accuracy can be further refined, if desired, by using the measured Doppler and the ownship velocity vector. Let us presume that the ownship velocity vector is given by $v_{own}$. Then we have the speed of a Doppler cell as:

$$\text{speed}_{Doppler} \approx v_{own} * ur_{NED} \quad \text{Eq (4)}$$

Monopulse Doppler refines the measured range and angle with its sub-beam with accuracy (by a factor of 100 or so) by the "overlap/intersection" between the precise Isorange (spheres) and IsoDoppler (cones), reference FIG. 6a. This is mitigated by the assumption that only (or mostly) main beam radar returns are used in forming the RDM/angles. The radar signal transmissions/returns should be kept unambiguous in range.

It should also be noted that the monopulse angle typically gives a resolution of 1/10th of the beamwidth. Assume a beamwidth of 3 degrees, this means a measurement resolution of 0.3 degrees. Hence, for an air vehicle flying at 35,000 feet using a monopulse radar looking down 70 degrees, the slant range to the ground would be roughly 11.4 km. With the expected monopulse resolution, that would mean a ground patch size of roughly 60 meters by 60 meters, which is slightly better than DTED level 1 post spacing of 100×100 meters. However, while a monopulse radar gives the required resolution, the IMU providing the coordinate transform S may not provide comparable accuracy in ownship attitude (i.e. pitch, roll, yaw, although mostly yaw). This can be compensated for by noting that the Doppler shift of the cell defines the value of θ relative to the ownship velocity vector. Hence the monopulse estimate of the line-of-sight vector ur can be further refined using the ownship velocity vector and the Doppler shift.

If we assume that the measurement of Doppler and the measurement of air vehicle's velocity are more accurate than the measurement of monopulse angle (or the equivalent) then we can refine the direction vector measurement in such a way that it exactly matches the above equation. That is find $u_{NED}$ such that:

$$\text{speed}_{Doppler} = v_{vehicle} * u_{NED} \text{ and } u_{NED} \approx ur_{NED} \quad \text{Eq (5)}$$

Given $u_{NED}$ we can find $r_{NED}$ as $$r_{NED} = \text{slant}_{range} * u_{NED} \quad \text{Eq (6)}$$

Note that $r_{NED}$ refers to one point in the $r_{NED}$ set. We will refer to the entire set of measurements as $\{r_{NED}\}$ or $R_{NED}$, which defines the space stabilized image (x,y,z) in NED reference frame relative to the aircraft at an altitude z. Ideally this set only includes those indexed cells corresponding to the antenna main beam return.

Looking again at FIGS. 6a and 6b, one can see how the Doppler measurement provides greater resolution than the angular measurements. However, Doppler can be ambiguous, but this ambiguity is solved using the angular measurements. However, these measurements may suffer from range aliasing (if the radar's pulse repetition interval (PRI) is too high) or from velocity aliasing (if the PRF is too low). Here, it is assumed that slant range is unambiguous, which can be achieved by adjusting the effective PRI to be long enough to assure that any return as far away as the radar horizon is unambiguous.

Given the current estimate of air vehicle's altitude (above WGS ellipsoid), one can compute the range to the air vehicle's radar horizon (for a smooth earth). The radar waveform is then chosen to give unambiguous range out to the radar horizon. Examples waveforms are low pulse repetition interval (LPRI) range gated or high PRF (HPRI) frequency modulation (FM) Ranging (FMR). The unambiguous Doppler is chosen to be that for a return that would be straight ahead. Doppler processing can be preceded by a (analog or digital) filter that limits the maximum frequency.

For good correlation, the grid density and spacing of the radar (x,y,z) map will differ from the grid density and spacing of the digital terrain database map, i.e. the radar image will have much higher resolution than the terrain database. The air vehicle's position is initially known and can be translated into latitude and longitude position, the same as most digital terrain databases. Therefore, the radar image can be sub-sampled to the nearest point in the digital terrain database post spacing measurements to be used in the correlation. Another alternative would be to grid post average the over-sampled radar measurements to provide a similar terrain post sampling radar image. A 'good' correlation is then defined as one where the average distance between the measured point and the stored point is less the larger of the two grid densities.

Figure 9:
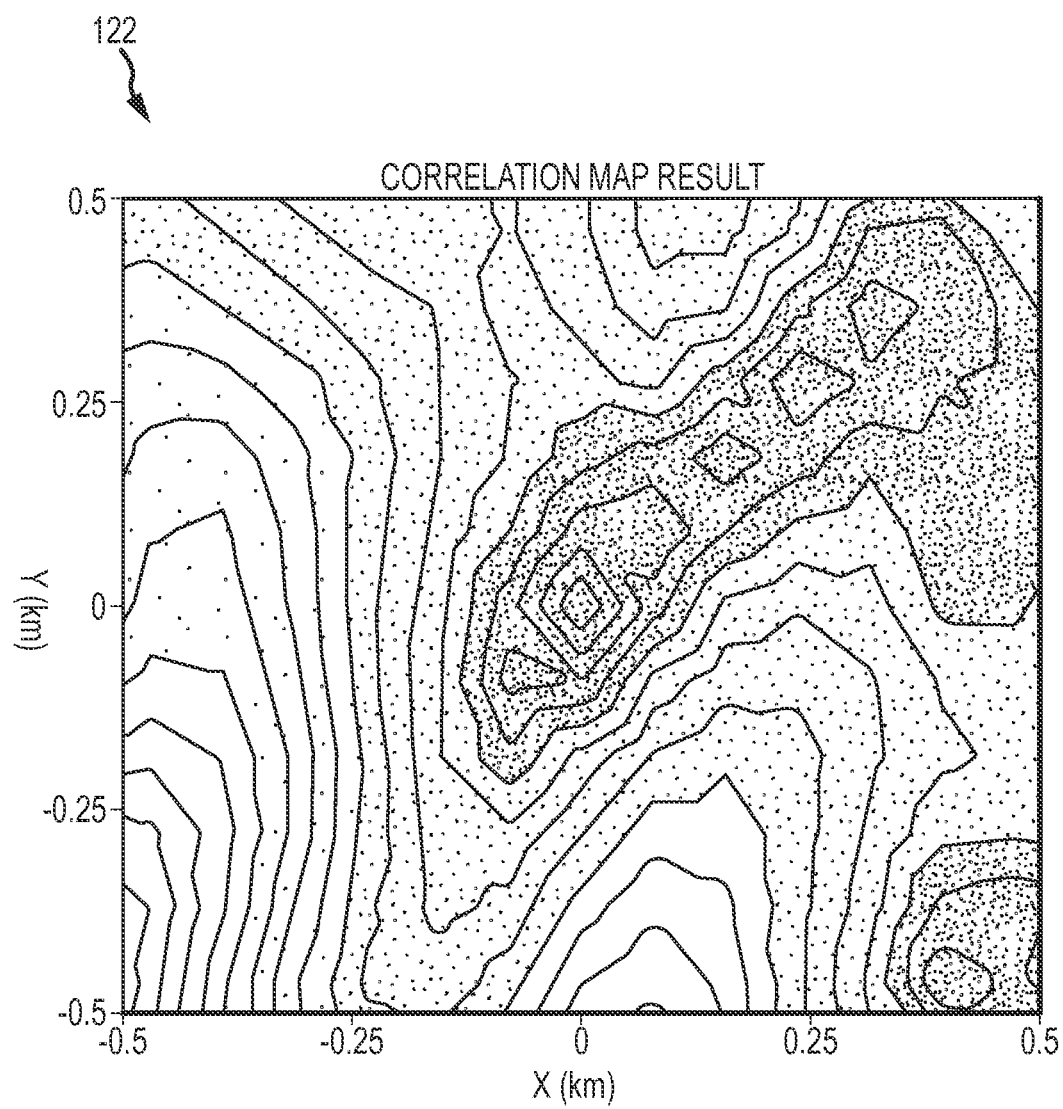
FIG. 9 is a diagram of a correlation map for determining the correlation offset.

Referring again to FIGS. 3 and 4, terrain correlator 58 correlates the (x,y,z) image to the selected terrain segment in the terrain database (step 120). The correlation operator produces a correlation map 122 that plots the magnitude of the operator versus offset in x and y as shown in FIG. 9. In general, the correlation offset is read out of the map as the x, y coordinates of the sharpest and highest peak. In this example, the best correlation (highest and sharpest peak) occurs at a correlation offset of (0,0), which indicates no error in the current navigation position estimate.

The terrain correlator determines whether there is a high probability of a good correlation (step 124). If a good correlation does not exist, the terrain selector selects another terrain segment to illuminate (step 126) and steps 78, 80, 96, 106, 120 and 124 are repeated. If the correlation is successful, the navigation processor uses the correlation offset to determine the ground position of the antenna main beam (step 128), which is mapped using the slant range and pointing vector to update the navigation position estimate and reset the uncertainty region (e.g. the covariance matrix of the Kalman filter) (step 130). The update will have its own uncertainty region based on the resolution of the digital terrain data base and associated measurement errors, and the resolution of the radar imagery and associated measurement errors, typically less than 1 meter.

Since aircraft position is itself an $\{x,y,z\}$ vector, a direct correlation to update the aircraft position can become a very computationally intensive search over three dimensions. Rather, the problem can be reduced to two search dimensions (x,y) if the current aircraft elevation above ground (altitude (z)) is accurately known, by say a radar altimeter measurement from the same radar that gave the range/Doppler map above, however looking forward at a steeper downward angle.

At this point there are many ways to correlate the spaced stabilized radar set $\{r_{NED}\}$ with the digital terrain set $\{r_{DTED}\}$. An outline of the steps following the acquisition of $\{r_{NED}\}$ to be performed is as follows:

Translate the radar slantrange into altitude and radar ground position

Radar image $\{r_{NED}\}$ is relative to NED via the ownship's IMU

Have arbitrary $z_{offset}$ between $\{r_{NED}\}$ and $r_{beam}$—call it zero @ $r_{beam}$ (a single point within $r_{NED}$)

Correlate $\{r_{NED}\}$ to $r_{DTED}$ set and obtain x,y offset

Compute air vehicle's new position with computed $z_{offset}$.

However, without any attempt at efficiency, the most straightforward approach would be to convert the space stabilized $\{r_{NED}\}$ radar image (which is referenced relative to the aircraft position) to a set referenced relative to the antenna beam position on the ground, which we will call $r_{beam}$. Given this radar set, it is straightforward to compute a goodness-fit metric between $\{r_{NED}\}$ and $\{r_{DTED}\}$. Call this metric ρ. Then the issue becomes one of varying aircraft position (both in latitude and longitude and in altitude) until the metric ρ indicates a best fit.

From the above operations we have:

$\{r_{DTED}\}$=digital terrain elevation database set which reference is NED relative to sea level $\{r_{NED}\}$=mapping from the radar image set {range, Doppler, angles} that is space stabilized in NED (reference space is NED relative to air vehicle's altitude $r_{beam}$=a point referenced relative to the air vehicle's antenna beam position on the ground with some z offset (unknown value) above sea level that will be computed $\{r_{MAP}\}$=a set referenced to NED by adding in the (presumed) air vehicle's position; [A/C altitude $-z_{slantrange}$ (in coordinate as measured to the actual digital terrain map, referenced to sea level. $\{r_{MAP}\}$ set is formed about $r_{beam}$ position points which then can be computed back to A/C reference frame To compute the antenna beam position on the ground $r_{beam}$:

$$r_{beam} = r_{NED} - r_{beam\_center} \qquad \text{Eq (7)}$$

Note that mean z value of $\{r_{beam}\}$ is roughly zero meters with the beam center being exactly zero meters. Further define the arrays $\{x_{beam}\}$, $\{y_{beam}\}$ and $\{z_{beam}\}$ as the components of $\{r_{beam}\}$, and let $X_{DTED}$, $Y_{DTED}$ and $Z_{DTED}$ be the components of the digital terrain reference map. Assuming that the radar map and the reference map have corresponding x and y grid spacing, we can refer to the indices $idx_{beam}$ and $idy_{beam}$ as the indices in the reference map where the beam center would fall. One would then expect that the differences in the Z positions between the radar map $\{z_{beam}\}$ and the reference map $\{z_{DTED}\}$ would:

be equal to the elevation of the ground where the radar beam hits the variance of the difference would be a minimum at that point The computed x and y offset from the expected beam position where the variance actually is a minimum then is the correction to the estimate of the ownship location, can be written as:

$$z_{bias}(i, j) = \frac{1}{N} * \sum_{i}^{N-1} z_{NED}(i) - z_{DTED}(i + j) \qquad \text{Eq (8)}$$

$$Corr(i, j) = \frac{1}{N} * \sum_{i}^{N-1} |z_{NED}(i) - z_{DTED}(i + j) - z_{bias}(i, j)| \qquad \text{Eq (9)}$$

Where N is the number of elements in the radar beam map and j is chosen such that j=0 corresponds to the position where the radar beam is computed to be. When the index j for which Corr is a minimum, this becomes the best estimate of where the radar beam is actually impinging upon the ground. If there were no error in the known position, then j would be 0 in the scheme described. Note that in the above description, the set $\{z_{NED}\}$ and $\{z_{DTED}\}$ were indexed with one index. In general, the maps are likely to be indexed in two indices (one for x and one for y). In that case one would substitute the single index i with two indices and the single sum with two sums (one for each index). The correction to aircraft's altitude is based upon the known position of the beam on the ground segment and the computed $z_{bias}$.

Figure 10:
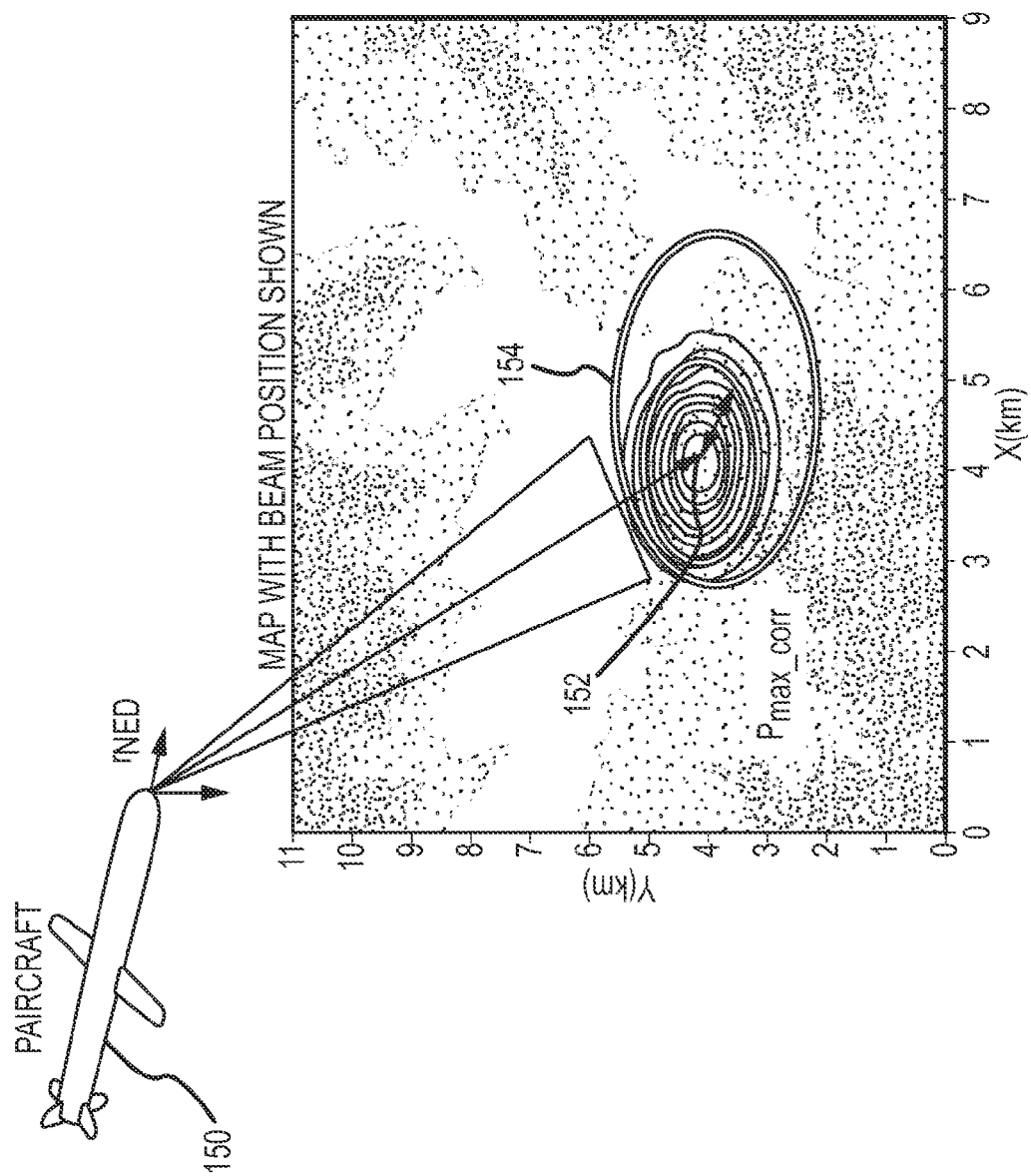
FIG. 10 is a diagram illustrating a mapping of the position of the antenna main beam on the ground to a navigation position estimate in (x,y,z).

If as shown in FIG. 10 we represent a point in space of the air vehicle 150 with $P_{aircraft}$ and represent a point 152 of the ground segment 154 of the max correlation peak (Corr(ij)) with $P_{max\_corr}$, (the (x,y) offset), the new computed position of the air vehicle can be computed by the following:

$$P_{aircraft} = P\text{max\_corr} + r_{NED} \qquad \text{Eq (10)}$$

Add in the computed $z_{bias}$ to correct the Paircraft altitude and the terrain aided navigation using multi-channel monopulse radar imaging is completed.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method for autonomous terrain aided navigation of an airborne vehicle, upon receipt of a request for a terrain navigation update performing the steps of:
    determining a radar field-of-regard (FOR) search space about the vehicle's flight path from a navigation position estimate and an off-axis capability of the vehicle's multi-channel radar transceiver;
    searching a terrain elevation database within the search space to select a terrain segment having prominent terrain features that exhibit at least a minimum variation in elevation;
    computing an off-axis command angle for an antenna main beam to image the selected terrain segment;
    transmitting at least one RF pulse burst in a 2-35 GHz band in the antenna main beam at the off-axis command angle to illuminate terrain encompassing the selected terrain segment;
    simultaneously receiving and sampling the RF returns in at least three receive channels to produce a three-dimensional range/Doppler map in which each range/Doppler indexed cell includes a monopulse angle vector (x,y,z) and an intensity Q;
    converting the three-dimensional range/Doppler map into a three-dimensional image in (x,y,z); and
    correlating the three-dimensional image and the selected terrain segment in a reference frame of the database to provide a navigation position estimate of the airborne vehicle.

2. The method of claim 1, wherein the terrain segment is selected by convolving possible terrain segments with themselves and selecting a terrain segment that satisfies a specified criteria.

3. The method of claim 1, wherein the airborne vehicle has a current navigation position estimate with an error component bounded by an uncertainty region, wherein the terrain illuminated by the antenna main beam is oversized with respect to the selected terrain segment to account for the uncertainty region.

4. The method of claim 1, further comprising varying the width of the antenna main beam to illuminate terrain encompassing the selected terrain segment.

5. The method of claim 1, wherein converting the three-dimensional range/Doppler map into a three-dimensional image in (x,y,z) comprises:
    using the range, Doppler and monopulse angle vector of the indexed cells and the off-axis command angle to identify a subset of indexed cells corresponding to the antenna main beam return; and
    using the range and monopulse angle vector to map the subset of indexed cells into the three-dimensional image in (x,y,z).

6. The method of claim 5, further comprising:
    using the Doppler measurement to refine the range and monopulse angle vector measurements.

7. The method of claim 1, wherein the three-dimensional image and the selected terrain segment are correlated by varying the navigation position estimate to find the best correlation in (x,y,z) space.

8. The method of claim 1, wherein the three-dimensional image and the selected terrain segment are correlated by:
    providing an estimate of the vehicle altitude;
    computing a slant range vector from the vehicle to a position of the antenna main beam on the ground;
    finding the best correlation in (x,y) space that provides the position of the antenna main beam on the ground; and
    adding the slant range vector to the position of the antenna main beam on the ground to update the navigation position estimate.

9. The method of claim 1, wherein said at least one RF pulse burst is only transmitted upon receipt of a request for the terrain navigation update.

10. A method for autonomous terrain aided navigation of an airborne vehicle,
    providing an initial navigation position estimate of the vehicle;
    providing inertial measurements of motion of the airborne vehicle;
    updating the navigation position estimate in (x,y,z) of the airborne vehicle based on the inertial measurements, said position estimate having an error component bounded by an uncertainty region that increases with time based on accumulated errors of the inertial measurements;
    issuing a request for the terrain navigation update when the uncertainty region reaches a certain threshold;
    determining a radar field-of-regard (FOR) search space about the vehicle's flight path from a navigation position estimate and an off-axis capability of the vehicle's multi-channel radar transceiver;
    searching a terrain elevation database within the search space to select a terrain segment having prominent terrain features that exhibit at least a minimum variation in elevation;
    computing an off-axis command angle for an antenna main beam to image the selected terrain segment;
    transmitting at least one RF pulse burst in a 2-35 GHz band in the antenna main beam at the off-axis command angle to illuminate terrain encompassing the selected terrain segment;
    simultaneously receiving and sampling the RF returns in at least three receive channels to produce a three-dimensional range/Doppler map in which each range/Doppler indexed cell includes a monopulse angle vector (x,y,z) and an intensity Q;
    converting the three-dimensional range/Doppler map into a three-dimensional image in (x,y,z); and
    correlating the three-dimensional image and the selected terrain segment in a reference frame of the database to provide a navigation position estimate of the airborne vehicle and to reset its uncertainty region.

11. The method of claim 10, wherein converting the three-dimensional range/Doppler map into a three-dimensional image in (x,y,z) comprises:
    using the range, Doppler and monopulse angle vector of the indexed cells and the off-axis command angle to identify a subset of indexed cells corresponding to the antenna main beam return; and
    using the range and monopulse angle vector to map the subset of indexed cells into the three-dimensional image in (x,y,z).

12. The method of claim 11, further comprising:
    using the Doppler measurement to refine the range and monopulse angle vector measurements.

13. The method of claim 10, wherein the three-dimensional image and the selected terrain segment are correlated by:
    providing an estimate of the vehicle altitude;

computing a slant range vector from the vehicle to a position of the antenna main beam on the ground;

finding the best correlation in (x,y) space that provides the position of the antenna main beam on the ground; and adding the slant range vector to the position of the antenna main beam on the ground to update the navigation position estimate.

14. A terrain aided navigated airborne vehicle, comprising:

a multi-channel radar configured to transmit at least one RF pulse burst in a 2-35 GHz band in an antenna main beam at a commanded angle and to simultaneously receive and sample the RF returns in the multiple channels;

a radar processor configured to process the sampled RF returns to produce a three-dimensional range/Doppler map in which each range/Doppler indexed cell includes a monopulse angle vector (x,y,z) and an intensity Q and to convert the range/Doppler map to an image in (x,y,z);

a terrain elevation database comprising elevation z of terrain at given locations (x,y) in a reference frame, said database formatted independently of a flight path of the airborne vehicle over the terrain;

an inertial measurement unit configured to provide inertial measurements of motion of the airborne vehicle;

a navigation processor configured to update a navigation position estimate in (x,y,z) space of the airborne vehicle based on the inertial measurements, said position estimate having an error component bounded by an uncertainty region that increases with time based on accumulated errors of the inertial measurements, to issue a request for a terrain navigation update when the uncertainty region reaches a certain threshold and to define a radar field-of-regard (FOR) search space about the vehicle's flight path from the current navigation position estimate and an off-axis capability of the vehicle's multi-channel radar transceiver;

a terrain selector configured to search the terrain elevation database within the search space to select a terrain segment having prominent terrain features that exhibit at least a minimum variation in elevation;

said navigation processor computing the commanded angle for the antenna main beam to image the selected terrain segment and passing the commanded angle to the multi-channel radar; and a terrain correlator configured to correlate the three-dimensional image and the selected terrain segment in a reference frame of the database to provide a correlation offset to the navigation processor to update the navigation position estimate and reset its uncertainty region.

15. The terrain aided navigated airborne vehicle of claim 14, wherein the radar processor is configured to convert the three-dimensional range/Doppler map into a three-dimensional image in (x,y,z) by using the range, Doppler and monopulse angle vector of the indexed cells and the off-axis command angle to identify a subset of indexed cells corresponding to the antenna main beam return and to use the range and monopulse angle vector to map the subset of indexed cells into the three-dimensional image in (x,y,z).

16. The terrain aided navigated airborne vehicle of claim 15, wherein the radar processor is configured to use the Doppler measurement to refine the range and monopulse angle vector measurements.

17. The terrain aided navigated airborne vehicle of claim 14, wherein the terrain correlator is configured to correlate three-dimensional image and the selected terrain segment are correlated by:

providing an estimate of the vehicle altitude;

computing a slant range vector from the vehicle to a position of the antenna main beam on the ground; and finding the best correlation in (x,y) space that provides the position of the antenna main beam on the ground, wherein the navigation processor is configured to add the slant range vector to the position of the antenna main beam on the ground to update the navigation position estimate.

18. The terrain aided navigated airborne vehicle of claim 14, wherein the multi-channel radar comprises an active electronic steered array (AESA).

* * * * *